United States Patent [19]
Vik et al.

[11] Patent Number: 5,920,282
[45] Date of Patent: Jul. 6, 1999

[54] DIGITALLY-CONTROLLED PULSE SHAPER FOR PULSED RADAR SYSTEMS AND RADAR WIND PROFILERS

[75] Inventors: David A. Vik, Austin, Tex.; John William Neuschaefer, Mead, Colo.; K. Russell Peterman, Georgetown, Tex.

[73] Assignee: Radian International LLC, Austin, Tex.

[21] Appl. No.: 08/952,550

[22] PCT Filed: Mar. 20, 1997

[86] PCT No.: PCT/US97/04430

§ 371 Date: Nov. 20, 1997

§ 102(e) Date: Nov. 20, 1997

[87] PCT Pub. No.: WO97/35210

PCT Pub. Date: Sep. 25, 1997

Related U.S. Application Data

[60] Provisional application No. 60/013,707, Mar. 20, 1996.

[51] Int. Cl.$^6$ .......................... G01S 7/282; G01S 13/522; G01S 13/95

[52] U.S. Cl. ........................ 342/204; 342/26; 342/159; 342/162

[58] Field of Search .......................... 342/204, 26, 159, 342/162

[56] References Cited

U.S. PATENT DOCUMENTS

| | | | |
|---|---|---|---|
| 4,123,755 | 10/1978 | Fishbein | 343/17.1 R |
| 4,737,969 | 4/1988 | Steel et al. | 375/67 |
| 4,748,642 | 5/1988 | Bertsche | 375/94 |
| 5,068,874 | 11/1991 | Leitch | 375/51 |
| 5,282,019 | 1/1994 | Basile et al. | 358/12 |
| 5,471,506 | 11/1995 | Chen | 375/242 |

*Primary Examiner*—John B. Sotomayor
*Attorney, Agent, or Firm*—Klauber & Jackson

[57] ABSTRACT

A digitally-controlled pulse shaper (DCPS) is provided which precisely controls the shape of the leading and trailing edges of a transmit pulse in a radar wind profiler, or pulsed-radar. In the case of pulse coding, where phase transitions are used to segment an otherwise longer pulse, the intra-pulse phase transitions are also shaped.

13 Claims, 5 Drawing Sheets

DIGITALLY-CONTROLLED PULSE SHAPER FOR PULSED RADAR SYSTEMS AND RADAR WIND PROFILERS

This application claims the benefit of U.S. Provisional Application Ser. No. 60/013,707 filed Mar. 20, 1996.

FIELD OF THE INVENTION

This invention relates generally to pulsed radar systems, and more specifically relates to methods and apparatus for shaping the radar pulses to reduce the spectral sidelobe energy being transmitted.

BACKGROUND OF THE INVENTION

Wind profilers are radars that are able to detect scattering of their electromagnetic energy by the atmosphere when there are no precipitation particles or hydrometers present. These radars are often referred to as "clear-air" radars to distinguish them from weather radars. The targets that cause the scattering for clear-air radars are the atmospheric inhomogeneities along the path of the transmitted radar beam. The present invention is particularly applicable to these types of radar, but more generally is applicable to any pulsed radar system in which a region of space is examined by transmitting normally rectangular radar pulses thereto and analyzing the resulting scattered and/or reflected energy.

The necessary bandwidth of a pulsed radar transmitter, such as used in a wind profiler, is defined as the frequency range between the first two zeroes in the Fourier spectrum of the transmitted pulse. For a perfect rectangular pulse envelope this is equal to two divided by the pulse duration. Any energy falling outside of this frequency range contributes nothing to the performance of the radar, but can cause problems with interference to other nearby radio services.

The occupied bandwidth of any pulsed radar, is defined as the frequency range containing ninety-nine percent of the transmitted power. This includes the useful power contained within the necessary bandwidth, and the power outside of the necessary bandwidth. The necessary bandwidth and the occupied bandwidth are shown graphically in FIG. 1. It is desirable to increase the proportion of the transmitted power contained within the necessary bandwidth in relation to that of the occupied bandwidth. A common practice is to compare the occupied bandwidth to the necessary bandwidth, expressed as the ratio of the occupied bandwidth to necessary bandwidth. A lower occupied bandwidth to necessary bandwidth ratio is indicative of a more efficient use of the RF spectrum.

Pulsed radars and wind profilers typically operate with transmit pulses with nearly rectangular leading and trailing edges. This rectangular pulse tends to have a rather large occupied bandwidth to necessary bandwidth ratio. One way to reduce the ratio of occupied to necessary bandwidth is by shaping the transmit pulse into something other than a rectangular pulse.

SUMMARY OF INVENTION

Pursuant to the present invention a digitally-controlled pulse shaper (DCPS) is provided which precisely controls the shape of the leading and trailing edges of the wind profiler, or pulsed-radar transmit pulse. In the case of pulse coding, where phase transitions are used to segment an otherwise longer pulse, the intra-pulse phase transitions are also shaped.

The use of the DCPS in pulsed radar and wind profilers can reduce the occupied to necessary bandwidth ratio from approximately 10.0 in the non-shaped case, to under 3.0 when shaped. FIG. 2 shows the spectrum of a typical prior art rectangular pulse. FIG. 3 shows the spectrum of a radar pulse shaped with the DCPS using a cosine squared transfer function, although an almost limitless number of pulse shapes is possible with this invention. The cosine squared transfer function is used as an example since the spectra content of a pulse with leading and trailing edges exhibiting this shape is well known.

FIGS. 1, 2 and 3 were displayed and captured on an HP4396A Network Analyzer/Spectrum Analyzer. The x-axis shows the spectra centered at a frequency of 60 MHZ. The spectra are displayed for a total span of 15 MHZ. The y-axis is an indication of the power of the spectral content. The y-axis is referenced to 0 dBm with 10 dB per division.

The DCPS is placed in the transmit chain after the existing intra-pulse phase shifter and before the existing pulse RF switch. In the case illustrated, the shaped pulse was formed at 60 MHZ, and up-converted (not shown in the drawing) to the required final transmit frequency. FIG. 3 shows a marked decrease in the power of the spectral sidelobes (power outside of the necessary bandwidth) as compared to FIG. 2.

Unlike methods that have been used in the past to control pulse shape, the precise shape and timing information for the pulse is calculated for each pulse length and stored in a data storage memory means such as an electronic read-only-memory (ROM). This results in a pulse shape that is stable and reproducible. Because the pulse shape data points are digitized and stored in ROM, the DCPS is not as susceptible to component aging and component parameter variations, as is the case with analog pulse shaping. This has a positive impact on system manufacture and maintenance.

Only data points for the pulse transition times are stored in ROM. By not having to store data points for the times when the pulse is in a steady state, memory storage requirements are greatly reduced.

Since the amplified pulse must be precisely reproduced from the pulse-shaped input, this invention requires a linear class A or a switched bias class AB amplifier to produce optimal results. The invention may be used in a conventional pulsed radar for precipitation or target tracking, or in a wind profiler radar where bandwidth control is necessary to reduce interference with other services or for obtaining a frequency authorization.

The unique design of the DCPS allows for simple integration into an existing wind profiler or pulsed radar design. The circuit interfaces with signals already present in most receivers and transmitters. Usually, none of the control electronics has to be modified to accommodate the DCPS.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
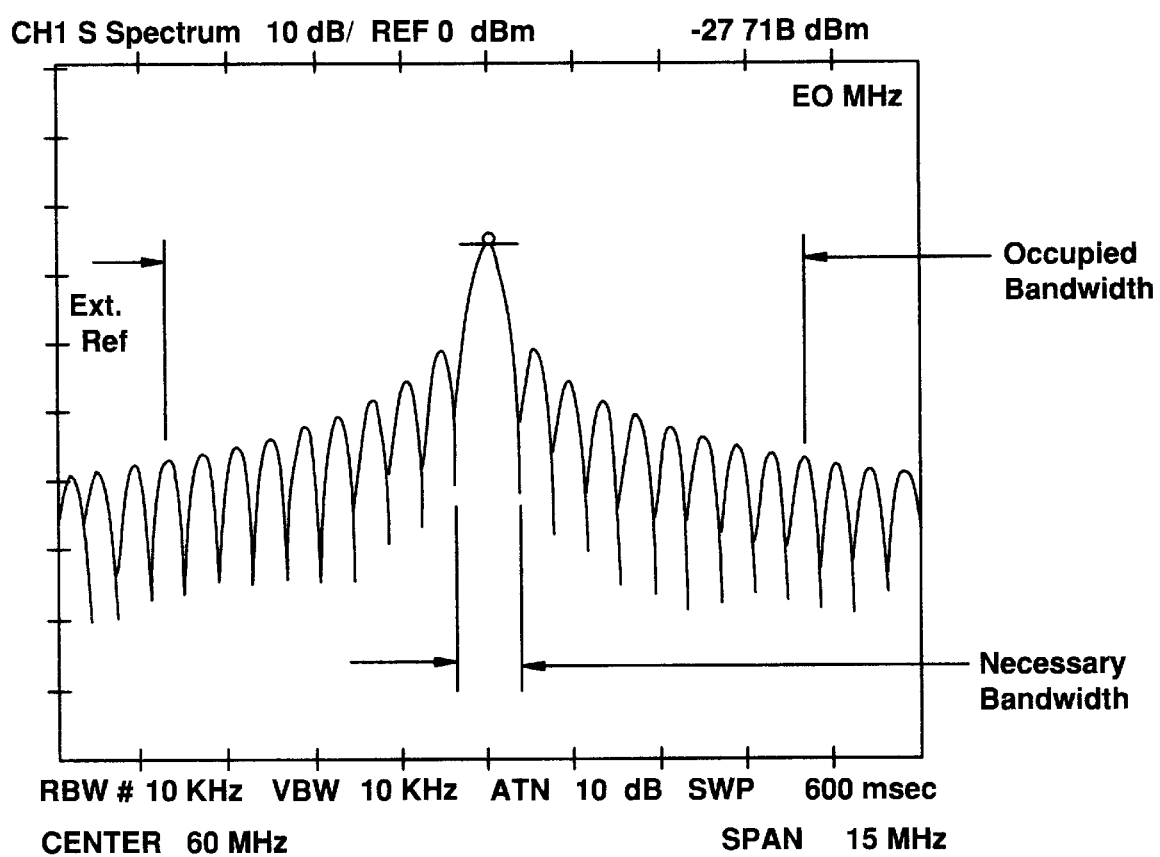
FIG. 1 is a graph illustrating necessary bandwidth and the occupied bandwidth for a typical pulsed radar.
Figure 2:
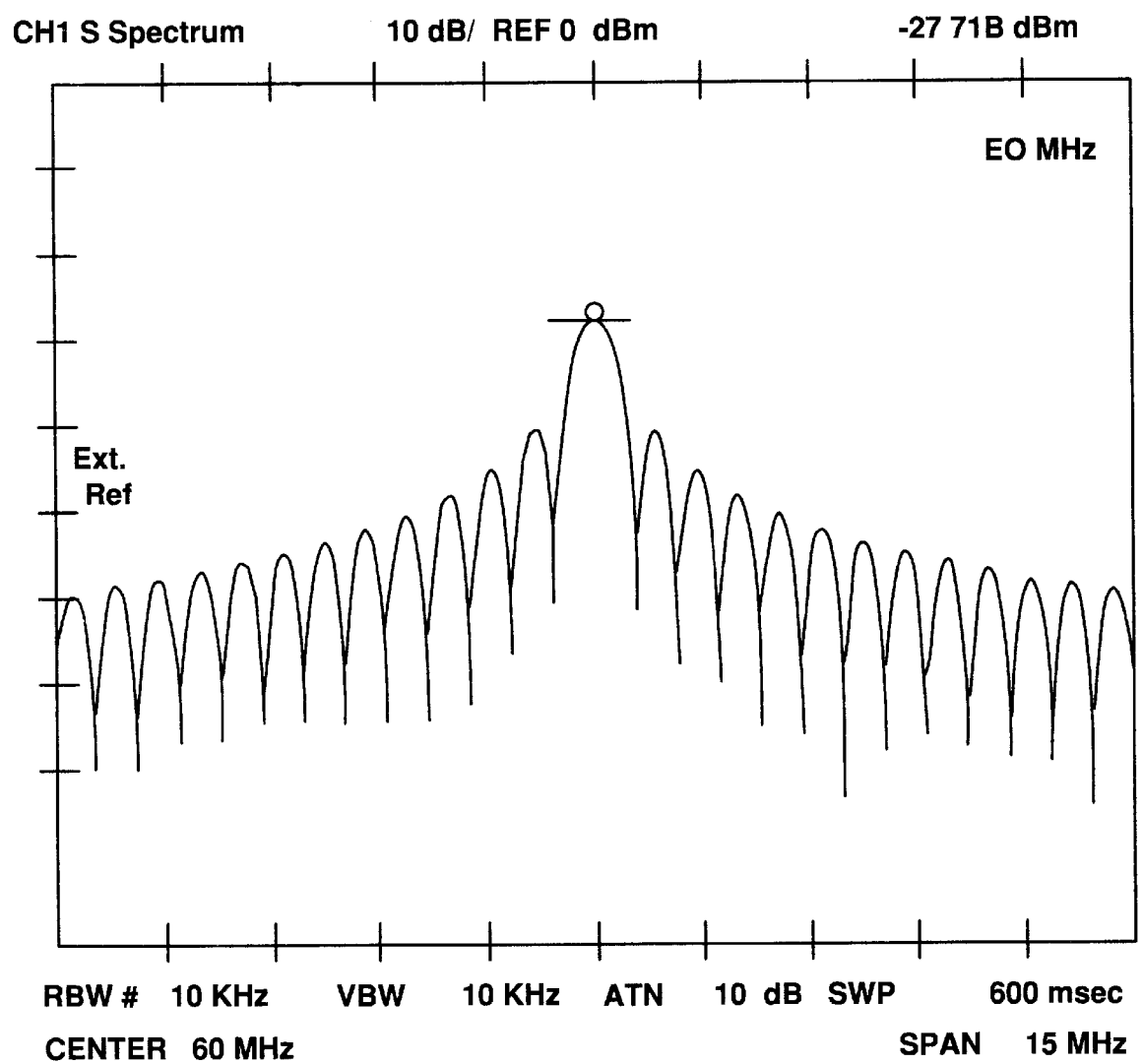
FIG. 2 is a graph which shows the spectrum of a typical prior art rectangular pulse.
Figure 3:
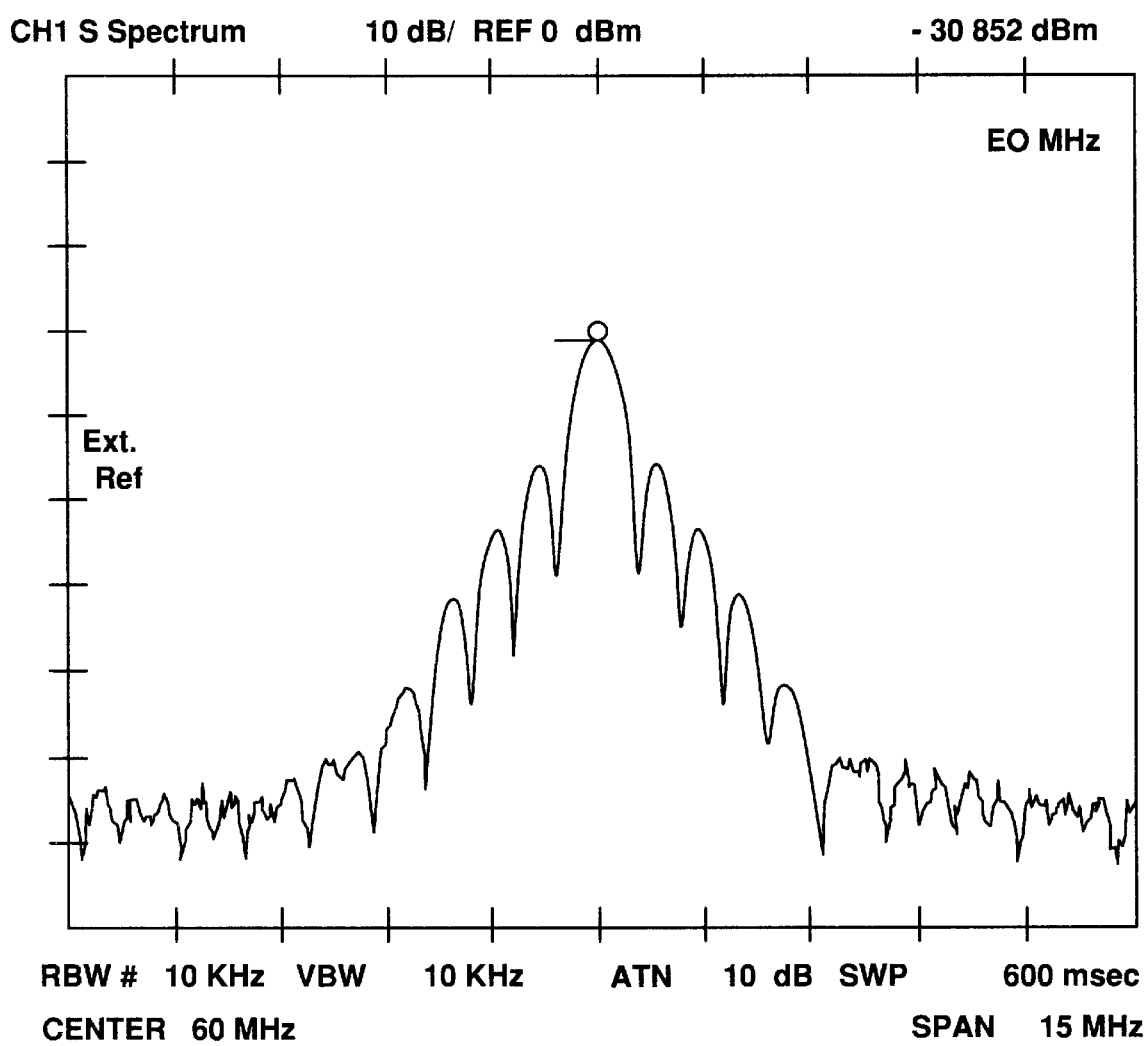
FIG. 3 is a graph showing the spectrum of a radar pulse shaped by use of the present invention, using a cosine squared transfer function.
Figure 4:
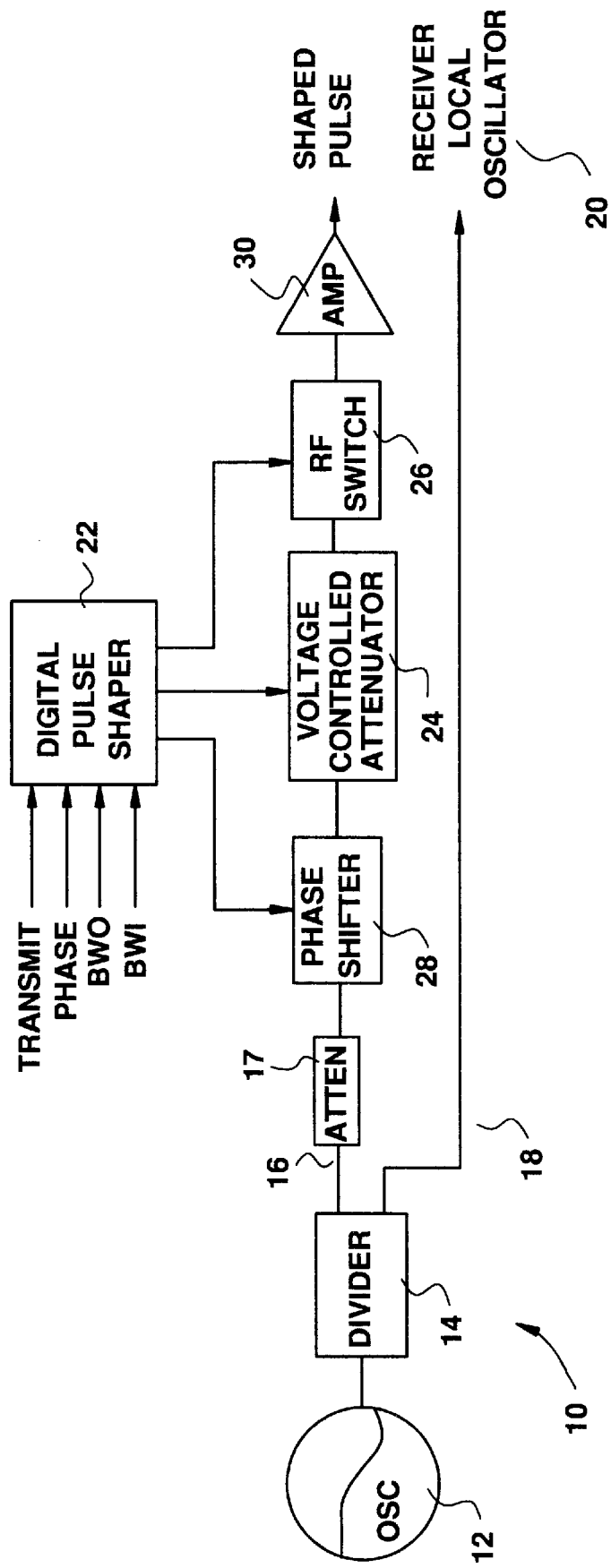
FIG. 4 is schematic block diagram, illustrating a pulse radar system incorporating the principles of the present invention.

FIG. 4 schematically illustrates how the invention is introduced into a typical radar transmit chain. The radar pulse system 10 of FIG. 4 includes an oscillator 12 the output from which is provided to a divider 14 which enables a signal to be provided to both the transmit branch 16 of the system as well as to the local oscillator portion 20 of the receiver branch 18. The receiver branch 18 is conventional and is not further described herein. Attenuator 17, RF switch 26 and amplifier 30 are conventional in a pulsed radar transmit branch. The added components in the transmit branch 16 are the DCPS electronics of digital pulse shaper 22 and the voltage controlled attenuator 24. Normally, the TRANSMIT (TX) and PHASE (PHZ) signals directly control the RF switch 26 and phase shifter 28 circuitry, respectively. With the DCPS, the TX and PHZ signals are intercepted along with the transmit pulse width control signals BW0 and BW1, and the TX and PHZ signals are regenerated and an analog control signal is generated for voltage controlled attenuator 24.

Figure 5:
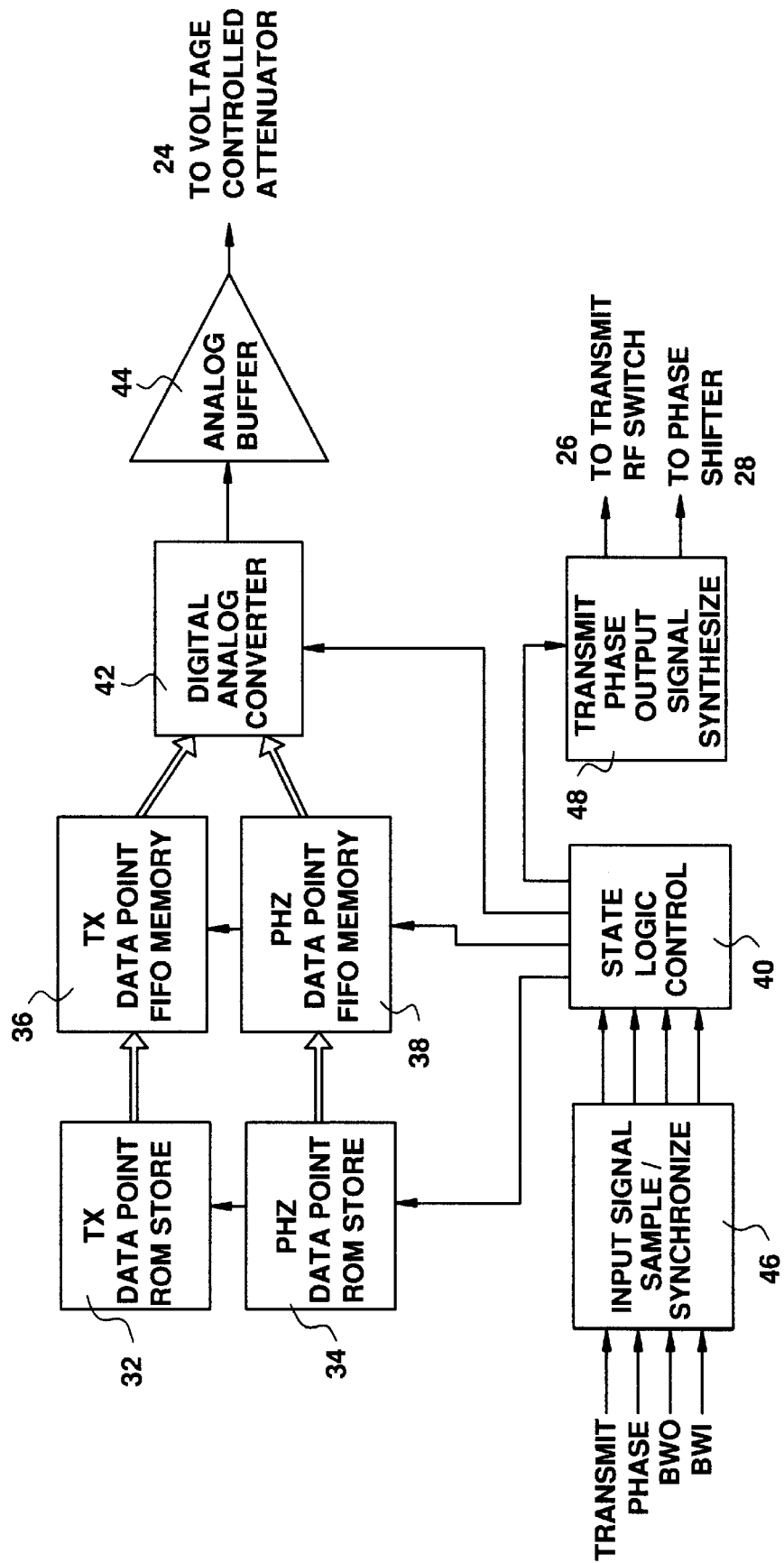
FIG. 5 is a schematic block diagram showing the digitally-controlled pulse shaper portion of the system of FIG. 4.

FIG. 5 depicts in greater detail the components and operation of digital pulse shaper block 22. The latter includes two sets of read-only-memory (ROM). The transmit ROM 32 is used to store the pre-calculated data points for the transmit pulse rise and fall transition times. The phase ROM 34 is used to store the precalculated data points for the intra-pulse phase transition times. The ROMs can store four data sets, one for each of the four transmit pulse widths used in the radar. The signals BW0 and BW1 select one of four data sets.

Since the ROMs are relatively slow speed devices, slower than the data sample rate required for the edge transition synthesis, the data are read out of the ROMs and stored in high speed memory devices such as high speed synchronous first-in-first-out (FIFO) memories 36 and 38 during the radar inter-pulse period. The FIFOs are then read at the appropriate time within the transmit pulse and the data stream is used to drive the high speed digital-to-analog converter.

High speed counters are used to address the ROMs. Signals are generated by the DCPS state logic control 40 to control the operation of the address counters. Additional signals are generated by the state logic control to control the data write operations of the two FIFOs.

The data is read out of the ROMs 32 and 34 and stored into the FIFOs 36 and 38 at a clock rate of one-half the FIFO data read rate. This is due to the speed limitations of the relatively low speed ROMs. The two sets of high speed synchronous FIFO memory are used for driving the digital-to-analog converter (DAC) 42. The transition point data are stored into the FIFOs during each radar inter-pulse period, and read out during the appropriate signal transition time. The DCPS state logic control 40 generates signals to control the data read operation of the FIFOs. Data is read out of the transmit FIFO 36 during the rise and fall transition times of the transmit pulse. Data is read out of the phase FIFO 38 during the phase transition times of the radar intra-pulse period, in the case of pulse coding. Data is read from the FIFOs at a high enough data rate to provide the number of data points necessary to synthesis a clean, well shaped pulse edge transition.

Data is read out of the FIFOs only on pulse edge transitions. During steady state conditions before and after edge transitions, the necessary high or low values are placed in the data stream to the digital-to-analog converter 42 by state logic control 40. This avoids the necessity of loading the ROMs with data other than the edge transition data, greatly reducing the required size for the ROMs.

Digital-to-analog converter 42 is preferably a high speed eight-bit device which converts the digital data stream to an analog format suitable for input to the voltage variable attenuator 24. The output of digital-to-analog converter 42 is level shifted and filtered. The filtering is necessary in order to remove noise generated by the clocked data stream input to the DAC. The filtered analog signal is buffered at 44 and used to drive the voltage controlled attenuator 24.

The input signal sample/synchronize circuitry 46 samples the state of the four radar control signals TRANSMIT (TX), PHASE (PHZ), Pulse Width Control 0 (BW0), and Pulse Width Control 1 (BW0). These four signals are buffered, sampled, and synchronized to the DCPS's internal clock rate. The signals are then passed to the state logic control 40.

The previously described logic blocks are controlled and coordinated by state logic control 40. This is accomplished through the use of four interlocked synchronous state machines. There can be many ways to implement this function, the following is one example.

Each state machine is implemented as a Moore finite state machine, operating at the clocked data stream rate. Output signals controlling the operation of the DCPS components are encoded as bits in the controllers' state variables. The signals thus generated control the operation of the ROMs, FIFOs, address generators, and provides synchronization between the four state machines.

State logic control 40 senses the state of the radar transmit control signal (TX) and phase control signal (PHZ). The state logic control 40 determines the beginning of the transmit pulse rise time, the beginning of the transmit pulse fall time, and the beginning of the intra-pulse phase transition time, in the case of pulse coding. The length of the transmit and phase transition times are controlled by state logic control 40 through signals encoded in the transmit and phase transition data stored in the FIFOs.

The state logic control 40 controls the operation of reading the state transition data streams from the transmit and phase ROMs and writing to the transmit and phase FIFOs 36 and 38. This operation takes place during the radar inter-pulse period, so it is coordinated with the operation of reading data from the FIFOs 36 and 38 to the DAC 42.

The radar transmit (TX) and phase (PHZ) control signals must have the proper timing relationship with the edge transitions generated by the DCPS. For this reason, TX and PHZ are regenerated by the transmit/phase output signal synthesis circuitry 48. Transmit/phase output signal synthesis circuitry 48 is synchronized to state logic control 40, and the transition data point streams through signals generated by the state logic control and the transmit/phase output signal synthesis. The regenerated output signals TX and PHZ are buffered and output for use in the existing radar RF switch 26 and phase shifter 28.

While the present invention has been described in terms of specific embodiments thereof, it will be appreciated in view of the instant disclosure, that numerous variations upon the invention are now enabled to those skilled in the art, which variations yet reside within the scope of the present teachings. Accordingly the invention is to be broadly construed, and limited only by the scope and spirit of the claims now appended hereto.

What is claimed is:

1. In the method for examining a region of space by transmitting normally rectangular radar pulses thereto and analyzing the resulting scattered and/or reflected energy; the improvement enabling reduction of the ratio of occupied to necessary bandwidth for the transmitted pulses, comprising:

shaping the leading and trailing edges of the transmit pulses by a digitally controlled pulse shaper, to alter the normally rectangular pulse to a shape enabling said reduced ratio by storing calculated digitized data points representing the normalized pulse amplitudes for the said leading and trailing pulse edges of the reshaped pulses in a data storage memory means readout during transmit interpulse periods, and using the readout to shape the said pulses; and wherein only data points for pulse transition times are stored in said data storage memory means.

2. A method in accordance with claim 1, wherein the read out data points from said data storage memory means are written to a high speed memory device and read out from said memory device in response to transmit control signals for the said pulses.

3. A method in accordance with claim 2, wherein said data storage memory means comprises a ROM.

4. A method in accordance with claim 3, wherein said high speed memory device comprises a synchronous FIFO memory.

5. A method in accordance with claim 4, wherein said read out data points from said FIFO memory are converted to analog signals and provided to a voltage controlled attenuator, the output of which is used to shape said pulses.

6. A method in accordance with claim 1, wherein said normally rectangular radar pulses include intrapulse phase transitions; and wherein said intrapulse transitions are also shaped to enable said reduced ratio of occupied to necessary bandwidth.

7. In a system for generating and transmitting normally rectangular radar pulses toward a region of space sought to be examined; the improvement enabling reduction of the ratio of occupied to necessary bandwidth for the transmitted pulses, comprising:

digitally controlled pulse shaper means for shaping the leading and trailing edges of the transmitted pulses, to alter the normally rectangular pulse to a shape enabling said reduced ratios said digitally controlled pulse shaper means including a data storage memory means for storing only data points for pulse transition times, including calculated digitized data points representing the normalized pulse amplitudes for the said leading and trailing pulse edges: means for reading out stored data points during transmit interpulse periods, and means for utilizing the read-out values for shaping the said pulses.

8. A system in accordance with claim 7, wherein said normally rectangular radar pulses include intrapulse phase transitions; and wherein said system further includes means for also shaping said intrapulse transitions to enable said reduced ratio of occupied to necessary bandwidth.

9. A system in accordance with claim 7, further including a high speed memory device wherein the read out data points from said data storage memory means are written; and means for reading out said data points from said high speed memory device in response to transmit control signals for the said pulses.

10. A system in accordance with claim 9, wherein said data storage means comprises a ROM, and wherein said high speed memory device comprises a synchronous FIFO memory.

11. A system in accordance with claim 10, including D/A converter means wherein said read out data points from said FIFO memory are converted to analog signals; and a voltage controlled attenuator connected to receive the analog signals, the output of said attenuator being used to shape said pulses.

12. A system in accordance with claim 8, including a transmit data storage memory means for storing the pre-calculated data points for the transmit pulse rise and fall transition times, and a phase data storage memory means for storing the precalculated data points for the intra-pulse transition times.

13. A system in accordance with claim 12, wherein said transmit and phase data storage memory means comprise ROMs.

* * * * *